UNITED STATES PATENT OFFICE.

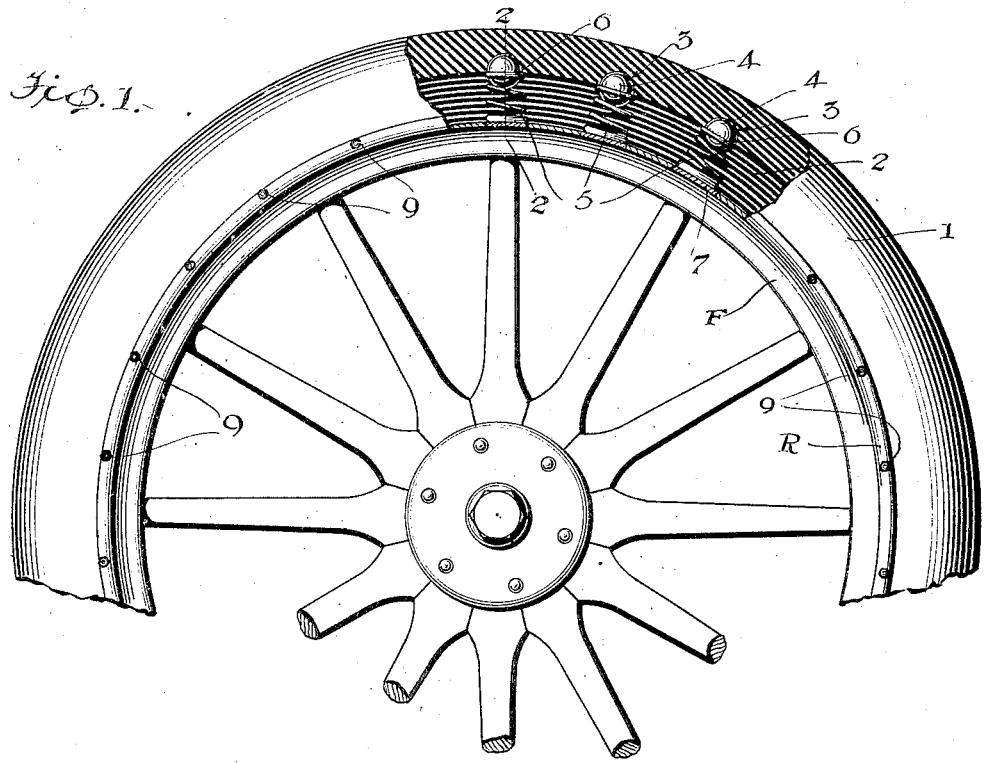
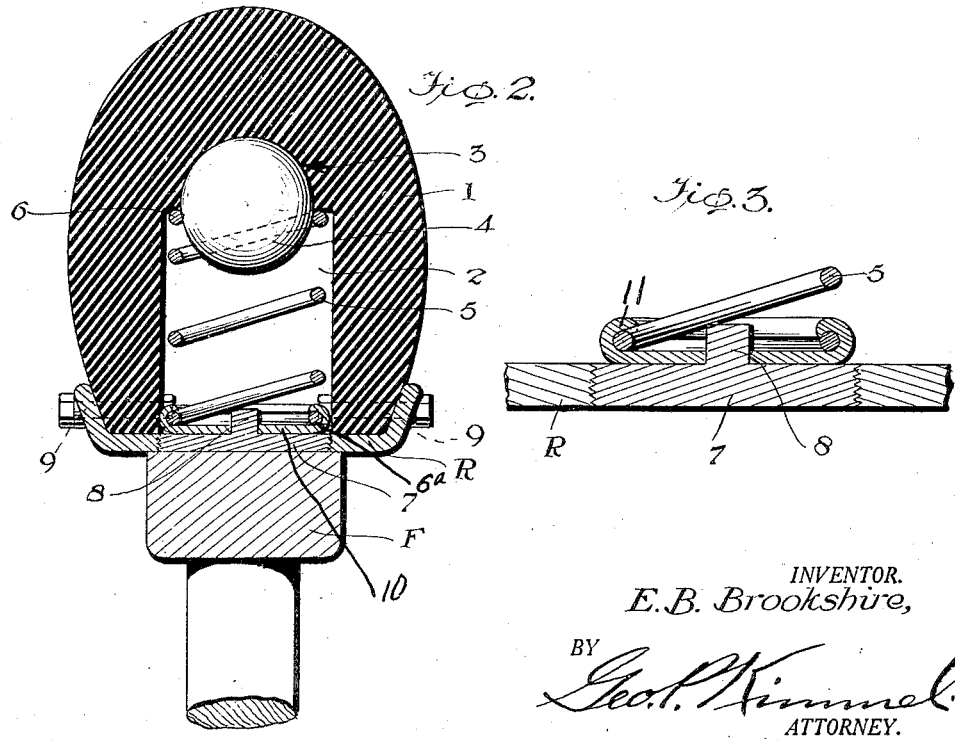
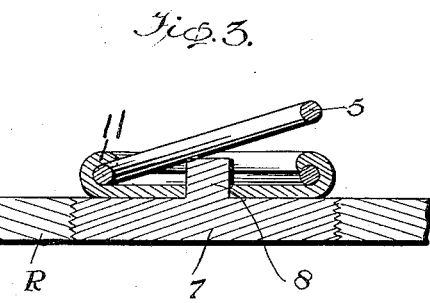

ELIJAH B. BROOKSHIRE, OF ELDORADO, KANSAS.

RESILIENT TIRE.

1,397,359.    Specification of Letters Patent.    Patented Nov. 15, 1921.

Application filed September 23, 1920.   Serial No. 412,113.

*To all whom it may concern:*

Be it known that I, ELIJAH B. BROOKSHIRE, a citizen of the United States, residing at Eldorado, in the county of Butler and State of Kansas, have invented certain new and useful Improvements in Resilient Tires, of which the following is a specification.

This invention relates to resilient vehicle tires.

The object of the invention is to provide a tire of this character which while having all of the advantages of a pneumatic tire has none of its disadvantages.

Another object is to provide a cheap and efficient tire of this character which is characterized by comparatively few parts and which may be readily applied to standard types of wheel rims in common use.

With these and other objects in view, the invention consists in certain novel features of construction as hereinafter shown and described and then specifically pointed out in the claims, and in the drawings illustrative of the preferred embodiment of the invention.

In the accompanying drawing:

Figure 1 is a side elevation of a portion of a vehicle wheel equipped with this improved tire, parts being broken out, and in section.

Fig. 2 is a transverse vertical section taken on the line 2—2 of Fig. 1, and,

Fig. 3 is a detail enlarged section through the bottom of the spring.

The tire constituting this invention comprises a solid rubber casing 1 having an annular straight walled channel 2 opening through the inner face thereof with ball sockets 3 in the inner wall of said channel to receive solid rubber balls 4 which are supported in the channel by coiled springs 5. Each of these springs has a ball encircling annular member 6 at its outer end, while its other end has a similar member 6ª which is mounted on a disk-like plate 10. This plate 10 has an inturned flange 11 forming a pocket to receive and hold the spring member 6ª engaged with the disk. This plate 10 rests on the rim R of the wheel and has extending through the center thereof a projection or stud 8 carried by a removable rim section 7. The sections 7 are circular and screwed into openings in the rim R. (See Fig. 3.) The flanges of the rim R and the opposed side walls of the casing 1 have bolts 9 passed therethrough for securing the tire to the wheel, the rim being carried by the felly F in the usual manner.

It is to be understood that the springs 5 and balls 4 are continuous around the tire and operate to impart the desired resiliency to the tire without danger of punctures or blowouts which are the bane of pneumatic tires.

The preferred embodiment of the invention is disclosed in the drawings and set forth in the specification, but it will be understood that any modifications within the scope of the claims may be made in the construction without departing from the principle of the invention or sacrificing any of its advantages.

What is claimed is:

1. A resilient tire comprising a one-piece solid rubber casing having an annular straight walled channel opening through the inner face thereof and having a plurality of peripherally spaced seats at the bottom thereof, a plurality of radially disposed coiled springs mounted in said channel, resilient balls disposed between the outer ends of said springs and the seats at the bottom of said channel, said springs each having an annular member at each of its ends, the annular member at one end of each spring being designed to encircle one of the balls and hold it seated, a disk-like plate having an inturned flange around its perimeter to form a pocket to receive the annular member at the other end of the spring whereby said plate is carried by said spring said plate being designed to rest on the rim in connection with which the tire is used.

2. The combination with a wheel rim having a plurality of peripherally spaced threaded circular openings therein equipped with disk-like closures having threaded engagement therewith and each closure provided with a radially and outwardly extending stud; of a resilient tire detachably mounted on said rim and having an annular channel opening through the inner face thereof opposite said rim, a plurality of coiled springs mounted in said channel, one being positioned over each of said rim closures and carrying at its inner end a disk-shaped plate having a central opening to receive the stud of said closure, and resilient balls carried by the outer ends of said springs and bearing against the bottom wall of said channel.

In testimony whereof, I affix my signature hereto.

ELIJAH B. BROOKSHIRE.